April 8, 1924.
W. SEIDEL
WHEEL
Filed Nov. 24, 1922
1,489,903
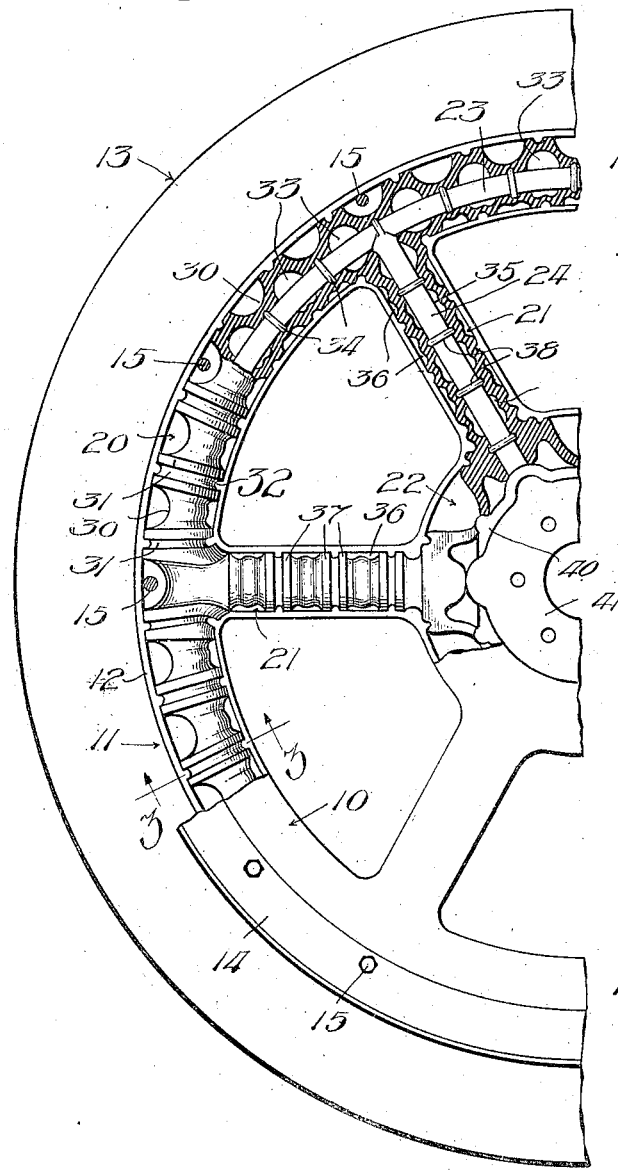
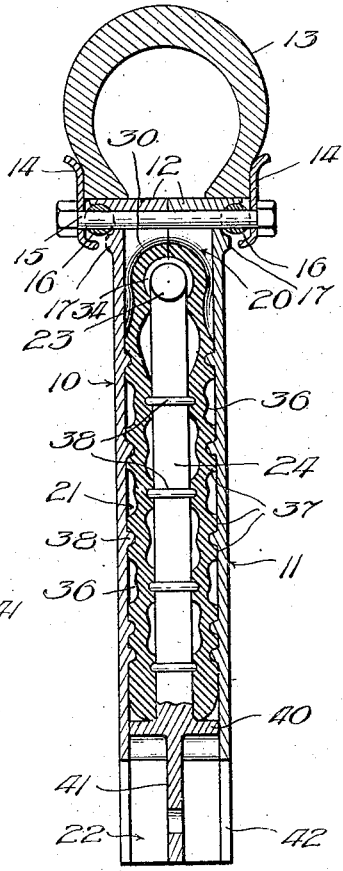
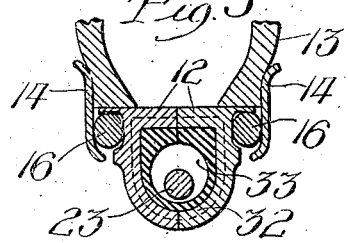
Inventor
William Seidel Patented Apr. 8, 1924.

1,489,903

UNITED STATES PATENT OFFICE.

WILLIAM SEIDEL, OF CHICAGO, ILLINOIS.

WHEEL.

Application filed November 24, 1922. Serial No. 602,951.

*To all whom it may concern:*

Be it known that I, WILLIAM SEIDEL, a citizen of the United States, residing at Chicago, in the county of Cook and State of Illinois, have invented certain new and useful Improvements in Wheels, of which the following is a specification.

This invention relates to an improved vehicle wheel, the principal objects being simplicity, cheapness, lightness, strength, and resiliency. Numerous other objects are in contemplation as well, as will more fully hereafter appear from the specification and claims, and from the accompanying drawing, in which—

Figure 1 is a fragmentary side elevation of a wheel embodying my invention, a portion of the proximate casing section and the cushioning element rearwardly thereof being broken away to exhibit the interior construction;

Fig. 2 is an enlarged transverse section through the wheel taken in the plane of one of its spokes; and Fig. 3 is a transverse section taken in the plane of line 3—3 of Fig. 1.

The suggestive embodiment of my invention, shown in the drawing, employs two complementary casing sections 10 and 11 arranged to provide between them a chambered space within which certain resilient elements are contained. Each casing section is in the form of a circular plate having at its periphery a flange which extends both inwardly and outwardly to provide a pair of rim sections 12 on which is mounted a tire 13. A pair of flanges 14 are adapted to be secured adjacent opposite sides of the tire base as through the medium of tie bolts 15 which are shown as extending transversely through each wheel section and through suitable cushion filler elements 16 which lie between the rim flanges and shoulders 17 formed upon both casing sections. These filler elements are retained in place adjacent the inner sides of the rim sections 12, and, when the connecting bolts 15 are tightened, all the parts will be securely maintained in the relationship described.

As will be seen from Fig. 1, each casing section is flanged to provide a peripheral channel 20 connecting with which are radial spoke channels 21 which open into an annular channel 22 in the region of the wheel center. Within the peripheral channel of the wheel is a circular core piece 23 occupying a medial position therein, and connected with this core piece are spokes 24 one extending centrally through each of the spoke channels. The space within the wheel chamber surrounding the core piece and spokes is occupied by a cushion element which is made preferably from rubber or rubber composition. This element consists of two sections, one a counterpart of the other, and each adapted to lie adjacent the other when arranged in one of the casing sections. These counterpart resilient elements accordingly extend half way around the core piece and spokes, meeting with each other in a medial plane.

A cushion element having these general characteristics is formed further with a plurality of annular grooves 30 and 31 in alternation, the former of considerably greater width than the latter. Within these latter grooves are received annular ribs 32 which project inwardly from the casing sections. Interiorly the cushioning elements are also provided with a series of annular spaces 33, these occurring in the plane of the narrower grooves 31 or intermediately of the wider grooves 30. Between each of these spaces is seated an annular rib 34 formed on the circular core piece. These ribs which may occur at regular intervals each lie within a groove in the cushioning elements, as appears clearly in Fig. 1, so as to hold the core and cushioning elements securely against circular travel one with respect to the other.

The portions of the resilient elements which extend within the spokes are formed somewhat similarly in that they are each provided with a series of annular spaces 35 surrounding the spokes and also with external grooves 36 leaving points of contact with the casing sections at annular shoulders or ribs 37. In addition the spokes are formed with annular ribs 38 each adapted to lie within a correspondingly shaped groove formed interiorly of the cushion elements. The inner ends of the resilient elements which are radially disposed along the spokes are rested against a flanged wall 40 of generally circular formation which connects with each of the spokes, as indicated in Fig. 2. As shown, a web projects inwardly toward the wheel center from the flanges 40, the casing sections to either side thereof being open as at 42. A construction such as this adapts itself for connection with a wheel axle (not shown) in any approved manner.

A wheel answering to the preceding description possesses numerous advantages from standpoints of manufacture and assembly. The two casing sections may be conveniently stamped, and the cushion elements, together with core pieces therein, be laid in place following which the two wheel sections are connected in permanent relation. The construction of the cushion elements is peculiar in that they are each formed with a plurality of chambers providing air spaces such that the elements are yieldable to a maximum degree. In addition these elements are maintained against shifting relative to the core pieces and spokes through the medium of the ribs which project from the one to engage the other.

I claim:

1. In a wheel, the combination of two connected casing sections providing between them a peripheral chamber from which radiate inwardly a plurality of spoke chambers, a core piece disposed within the several chambers, and cushioning means surrounding the core piece in each of the chambers and connected therewith in a manner to be held against movement longitudinally thereof, substantially as described.

2. In a wheel, the combination of two connected casing sections providing between them a peripheral chamber from which radiate inwardly a plurality of spoke chambers, a pair of cushion elements arranged to extend into all of the several chambers, one element being a counterpart of the other, and each adapted to lie upon opposite sides of a medial plane extending through the several chambers, there being co-operative elements formed on the cushion elements and the casing sections adapted to resist longitudinal movement of the former within the latter, and a core piece arranged between the cushion elements and extended through each of the several casing chambers, substantially as described.

3. In a wheel, the combination of two connected casing sections, providing between them a peripheral chamber from which extend inwardly a plurality of spoke chambers, a pair of cushion elements, each a counterpart of the other, extending into all of the several casing chambers, a core piece arranged between the two cushion elements and extended through all the casing chambers, and means connecting each cushion element both to the casing sections exteriorly thereof and to the core piece interiorly thereof in a manner to prevent relative longitudinal movement therebetween, substantially as described.

4. In a wheel, the combination of two connected casing sections providing between them a peripheral chamber from which extend a plurality of spoke chambers, cushion means extending within the several chambers, a core piece arranged within the cushion means, and also extending through the several chambers, there being formed within the cushion means a plurality of annular recesses, both interiorly and exteriorly thereof, providing air spaces both adjacent the core piece and the casing sections, and means connecting the cushion means to its associated parts whereby the cushion means is prevented from longitudinal movement with respect thereto, substantially as described.

5. A wheel formed to provide a peripheral chamber from which extend inwardly a plurality of spoke chambers, a cushion member arranged within the several chambers of the wheel, a core piece disposed within the cushion member and also extending through the several chambers of the wheel, and means formed on the cushion member adapted for engagement with the wheel walls and the core piece only at certain selected points in a manner to be held again longitudinal movement relative thereto, substantially as described.

WILLIAM SEIDEL.

Witness:
EPHRAIM BANNING.